US 7,174,139 B2

(12) United States Patent
Lipka et al.

(10) Patent No.: US 7,174,139 B2
(45) Date of Patent: Feb. 6, 2007

(54) DELAY CONTROL IN A DIGITAL RADIO TRANSMITTER SYSTEM

(75) Inventors: Dietmar Lipka, Berg (DE); Bojidar Hadjiski, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 10/451,251

(22) PCT Filed: Oct. 11, 2001

(86) PCT No.: PCT/EP01/11801

§ 371 (c)(1),
(2), (4) Date: Sep. 25, 2003

(87) PCT Pub. No.: WO02/052747

PCT Pub. Date: Jul. 4, 2002

(65) Prior Publication Data

US 2005/0101244 A1    May 12, 2005

(30) Foreign Application Priority Data

Dec. 22, 2000  (EP)  .................................. 00128371

(51) Int. Cl.
*H04B 1/04* (2006.01)
(52) U.S. Cl. .................... 455/113; 455/127.2; 455/126; 375/345
(58) Field of Classification Search ............. 455/232.1, 455/234.1, 240.1, 244.1, 242.1, 242.2, 243.1, 455/250.1, 102, 103, 113, 118, 119, 127.1, 455/127.2, 126, 147, 148; 375/146, 345
See application file for complete search history.

(56) References Cited

U.S. PATENT DOCUMENTS

| 5,084,706 | A |   | 1/1992  | Ross et al. |
|-----------|---|---|---------|-------------|
| 5,319,801 | A | * | 6/1994  | Richey et al. ................ 455/79 |
| 5,613,219 | A |   | 3/1997  | Vogel et al. |
| 5,649,288 | A | * | 7/1997  | De Loe et al. .......... 455/553.1 |
| 5,778,308 | A | * | 7/1998  | Sroka et al. ............. 455/115.1 |
| 5,834,979 | A | * | 11/1998 | Yatsuka ...................... 331/1 R |
| 6,697,641 | B1 | * | 2/2004 | Shapira .................... 455/562.1 |
| 6,741,874 | B1 | * | 5/2004 | Novorita et al. ............ 455/570 |
| 6,782,038 | B1 | * | 8/2004 | Khlat ......................... 375/147 |
| 7,010,280 | B1 | * | 3/2006 | Wilson ....................... 455/126 |

FOREIGN PATENT DOCUMENTS

WO        99/66637       12/1999

OTHER PUBLICATIONS

Written Opinion dated Oct. 3, 2002.

* cited by examiner

*Primary Examiner*—Edward F. Urban
*Assistant Examiner*—Nhan T. Le
(74) *Attorney, Agent, or Firm*—Nixon & Vanderhye P.C.

(57) ABSTRACT

A relative delay between analog R.F. output signals of a plurality of digital radio transmitters in a digital radio transmitter system is controlled. At least one interface receives delay information for each transmitter. A processing unit determines the relative delay between the output signals based on the received delay information. An adjuster adjusts in the digital domain the absolute delay of at least one of the radio transmitters in accordance with the determined relative delay.

26 Claims, 8 Drawing Sheets

DELAY CONTROL IN A DIGITAL RADIO TRANSMITTER SYSTEM

This application is the US national phase of international application PCT/EP01/11801 filed 11 Oct. 2001, which designated the US.

BACKGROUND OF THE INVENTION

1. Technical Field

The present invention relates to a digital radio transmitter system having a plurality of digital radio transmitters and more particularly to a device and a method for controlling a relative delay between analog radio frequency (R.F.) output signals of the plurality of digital radio transmitters.

2. Discussion of the Prior Art

Digital radio transmitter systems are an essential component of many modern communication systems like wideband systems for mobile communication. Generally, digital radio transmitter systems comprise one or more digital radio transmitters. A digital radio transmitter receives a digital input signal, converts the digital input signal into an analog signal and upconverts the analog signal to a n analog R.F. output signal. The analog R.F. output signal of the radio transmitter is passed through a power amplifier and then emitted from an antenna system.

An increasing number of applications require the use of digital radio transmitter systems with two or more radio transmitters, each radio transmitter defining a separate transmission branch. By equipping a digital radio transmitter system with a plurality of radio transmitters, applications like multi-carrier operation, radio transmitter diversity, load-sharing, and radio transmitter redundancy become feasible.

For example, during multi-carrier operation two or more carriers are jointly clipped in the digital domain of the digital radio transmitter system and then fed through separate radio transmitter branches. In other words, each carrier is upconverted to R.F. by a separate radio transmitter. After separate upconversion, the carriers are combined, jointly amplified and emitted from a single antenna. A typical example for a communication system using multiple carriers is a wideband code division multiple access (W-CDMA) system.

Another example for digital radio transmitter systems with two or more radio transmitter branches are systems operating according to the principle of radio transmitter diversity, of load-sharing or of radio transmitter redundancy. During these operation modes a single carrier is fed through two or more separate radio transmitters which operate in parallel. Each radio transmitter conducts a digital-analog conversion and then upconverts the carrier to R.F. The upconverted carriers outputted by the parallel radio transmitters are individually amplified and fed to individual antennas.

Of course, the concept of multi-carrier operation and the concepts of radio transmitter diversity, load-sharing or radio transmitter redundancy can be combined. As an example, the combination of 4-carrier operation and radio transmitter diversity necessitates eight separate radio transmitter branches which are configured such that the output signals of four radio transmitters are fed to one of two diversity antennas.

In digital radio transmitter systems with two or more digital radio transmitters, the individual radio transmitter branches ideally exhibit equal delay. In other words, if two digital signals have been concurrently fed into two different radio transmitters, the two corresponding analog R.F. output signals are ideally concurrently output. Thus, the absolute delays of two or more radio transmitter branches, i.e., the time difference between feeding an input signal into a radio transmitter and receiving the corresponding R.F. output signal from this radio transmitter, are ideally identical. This means in practice that the relative delay between the output signals of different radio transmitters, i.e., the time difference between outputting a first output signal by a first radio transmitter and outputting a corresponding second output signal by a second radio transmitter, must be as small as possible. For example, CDMA systems the relative delay must be small compared to the CDMA chip period.

If the relative delay increases, the transmission quality of a digital radio transmitter system with two or more radio transmitters decreases. In the case of multi-carrier operation, e.g., an increasing relative delay destroys the clipping effect. In the case of radio transmitter diversity, load-sharing or radio transmitter redundancy, an increasing relative delay results in self interference.

As has become apparent from the above, the object of maintaining a high transmission quality in a radio transmitter system with a plurality of radio transmitters necessitates equal or almost equal absolute delays within each radio transmitter branch to keep the relative delay between different radio transmitter branches as low a possible. However, equal or almost equal absolute delays are difficult to attain. One of the reasons therefore are the delay tolerances of the analog components like filters, amplifiers, etc. of individual radio transmitters. Exact synchronism between a plurality of radio transmitters is furthermore prevented by ambient temperature gradients, aging, replacement of radio transmitter boards in a single radio transmitter branch by boards with a different hardware version, etc.

There is, therefore, a need for a device which allows to control the relative delay between analog R.F. output signals of a plurality of digital radio transmitters in a digital radio transmitter system in an accurate and reliable manner to ensure a high transmission quality. There is also a need for a corresponding method for controlling the relative delay between analog R.F. output signals of a plurality of digital radio transmitters in a digital radio transmitter system.

SUMMARY OF THE INVENTION

The present invention satisfies this need by providing a device for controlling the relative delay between analog R.F. output signals of a plurality of digital radio transmitters in a digital radio transmitter system, the device comprising at least one interface for receiving delay information, a processing unit for determining the relative delay between the output signals based on the received delay information, and an adjusting system for adjusting in the digital domain the absolute delay of at least one of the radio transmitters in accordance with the determined relative delay.

According to the invention, the relative delay between the analog R.F. output signals of a plurality of digital radio transmitters is controlled by receiving delay information, by determining the relative delay between the output signals based on the received delay information, and by adjusting in the digital domain the absolute delay of at least one of the radio transmitters in accordance with the determined relative delay.

Until now, delays of radio transmitters are generally determined during production of the radio transmitters and for individual transmitters only. The invention, however, enables the determination of the relative delay during operation of the radio transmitter system and preferably during regular operation, i.e., while the radio transmitter system transmits user data. Thus, the relative delay can be monitored and, if necessary, be adjusted continuously or in specified time intervals while the radio transmitter system is in an active state. This ensures a constantly high transmission quality of the radio transmitter system. Moreover, since the relative delay is controlled by adjusting the absolute delay of one or more radio transmitters in the digital domain, i.e., prior to a digital-analog conversion step in the radio transmitter, the absolute delay and thus the relative delay can be accurately adjusted. This is due to the fact that the adjustment is advantageously performed digitally and not by means of analog components subject to significant delay tolerances. Also, adjustment in the digital domain ensures that the radio transmitter characteristics are not compromised by additional analog components in the analog part of the radio transmitter.

The adjustment of a radio transmitter's absolute delay can be performed with various objects in respect to the absolute delay between two or more output signals. Preferably, the absolute delay of one or more radio transmitters is adjusted such that the relative delay is minimized. However, certain applications may require the adjustment of the absolute delay such that the relative delay of the output signals assumes a specific value which need not necessarily be the minimal value.

The one or more interfaces for receiving delay information can be configured in various ways. For example, the interfaces can be realized as hardware solution or software solution depending on the nature of the delay information to be received.

According to one embodiment of the invention, the interface receives delay information from the individual radio transmitters. Each radio transmitter may comprise a delay database in which the measured delay of the individual transmitter is stored. The measuring and storing of the delay can be performed e.g. during production of the radio transmitter board. The processing unit may receive the individual delay of each radio transmitter via the interface and may then determine the relative delay between the output signals of the radio transmitters based on the received delay information.

According to a further embodiment, the control device according to the invention further comprises a detector system for detecting the analog R.F. output signals of the radio transmitters. The detected output signals are transmitted as delay information to the processing unit via the interface. The processing unit may then determine the relative delay between the output signals detected by the detector system.

The detector system for detecting the analog R.F. output signals of the radio transmitters can be configured to detect the output signals prior to their emission from an antenna system or after they have been emitted from an antenna system. According to a first embodiment, the detector system comprises a plurality of analog detector units and each detector unit is arranged such that it detects an analog output signal of one of the radio transmitters before an antenna to which this radio transmitter is connected. According to a second embodiment, the detector system comprises one or more detection antennas for detecting the analog R.F. output signals after they have been emitted by an antenna system of the digital radio transmitter system.

Depending on the arrangement of the plurality of digital radio transmitters in the digital radio transmitter system, the antenna system of the digital radio transmitter system may have different configurations. According to one embodiment, the two or more output signals of the two or more radio transmitters are combined by a combining unit and the combined signal is fed to an antenna system in the form of a single antenna. In such a case, the output signals of the radio transmitters are preferably detected prior to their combining. A single antenna for a plurality of radio transmitter branches is e.g. employed for operating a digital radio transmitter system in a multi-carrier mode. According to a further embodiment, each radio transmitter is connected to an individual antenna. Thus, the number of antennas of the antenna system may equal the number of radio transmitters. Separate antennas for separate radio transmitters are e.g. employed for operating a digital radio transmitter system in a radio transmitter diversity mode, in a load-sharing mode or in a redundancy mode. The two embodiments illustrated above can be combined such that a plurality of combining units is provided, each combining unit being coupled to a plurality of radio transmitters which then feed the combined output signals to a single antenna.

The output signals of the radio transmitters can be detected in many ways depending on the nature of the output signals. As an example, the output signals may be detected in the form of specific signal structures like characteristic signal peaks or characteristic symbol sequences. Of course, the detection of specific symbol sequences may necessitate to perform operations of a typical receiver stage like downconversion, sampling, analog-digital conversion, demodulation, etc., in order to obtain the symbol sequences from the detected analog R.F. output signals. Furthermore, the detection of the output signals may vary in respect of where and how the output signals are detected. If the output signals are e.g. detected by means of a single detection antenna, the output signals of different radio transmitters have to be separated in order to determine the relative delay. A separation of the respective output signals becomes possible if the output signals are detected in the form of mutually orthogonal signal components, e.g. mutually orthogonal symbol sequences.

After the analog R.F. output signals of the radio transmitters have been detected, the relative delay between the detected output signals has to be determined. The relative delay can e.g. be determined by measuring the time interval between detection of corresponding signal structures in the output signals from different radio transmitters. As pointed out above, the corresponding signal structures can be characteristic signal peaks or mutually orthogonal symbol sequences. As a further example, the relative delay may be determined as the time difference between the absolute delays in different radio transmitters. In other words, in a first step the processing unit may measure absolute delays of different radio transmitters and in a second step the processing unit may determine the relative delay by comparing the measured absolute delays. The absolute delays of the different radio transmitters can be determined in various ways. Preferably, each absolute delay is determined as the time interval between a common timing event for all radio transmitters or an individual timing event for each radio transmitter and detection of an analog output signal. A common timing event may be a synchronization signal of the digital radio transmitter system and an individual timing event may be the detection of a digital input signal of a specific radio transmitter. In order to generate the individual timing events, a plurality of digital detector units for detecting the digital input signals of the radio transmitters may be provided. Each digital detector may be arranged in a signal path before one of the radio transmitters in order to detect e.g. a specific signal component such as a characteristic signal peak in the digital input signal. In case of multi-carrier operation with clipping, the digital detector units preferably detect the digital input signal after the clipping units but before the radio transmitters.

After the relative delay between the detected output signals has been determined, the absolute delay of at least one of the radio transmitters has to be adjusted in the digital domain in accordance with the determined relative delay. This means that based on the result of the determination of the relative delay one or more absolute delays are adjusted as required in order to maintain a high transmission quality.

The relative delay is adjusted by means of adjusting one or more absolute delays and the absolute delays are adjusted by means of an adjusting system. Preferably, the adjusting system is configured as a delay system. In other words, the absolute delays are preferably adjusted such that the duration of the absolute delays is increased.

The adjusting system may be switched in an upsampling system of one or more radio transmitters. Consequently, the absolute delays may be adjusted during upsampling of the digital input signals in the radio transmitters. Preferably, the upsampling system comprises one or more sampling stages, each sampling stage operating at a specific sampling frequency. The adjusting unit may then adjust the relative delay in multiples of the specific sampling frequencies.

The adjusting system can comprise one or more individual adjusting units which may be arranged before, between or after the sampling stages. Each adjusting unit may comprise one or more shift registers and the sampling stages may be configured as interpolation filters.

The device for controlling a relative delay between analog R.F. output signals of a plurality of digital radio transmitters outlined above may be employed in various communication systems and preferably in mobile communication systems. As an example, a digital radio transmitter system comprising the device may be part of a base transceiver station of a mobile communication network.

BRIEF DESCRIPTION OF THE DRAWINGS

Further aspects and advantages of the invention will become apparent upon reading the following detailed description of preferred embodiments of the invention and upon reference to the drawings in which.

DESCRIPTION OF PREFERRED EMBODIMENTS

Referring now to the accompanying drawings, the preferred embodiments of this invention are described.

Figure 1:
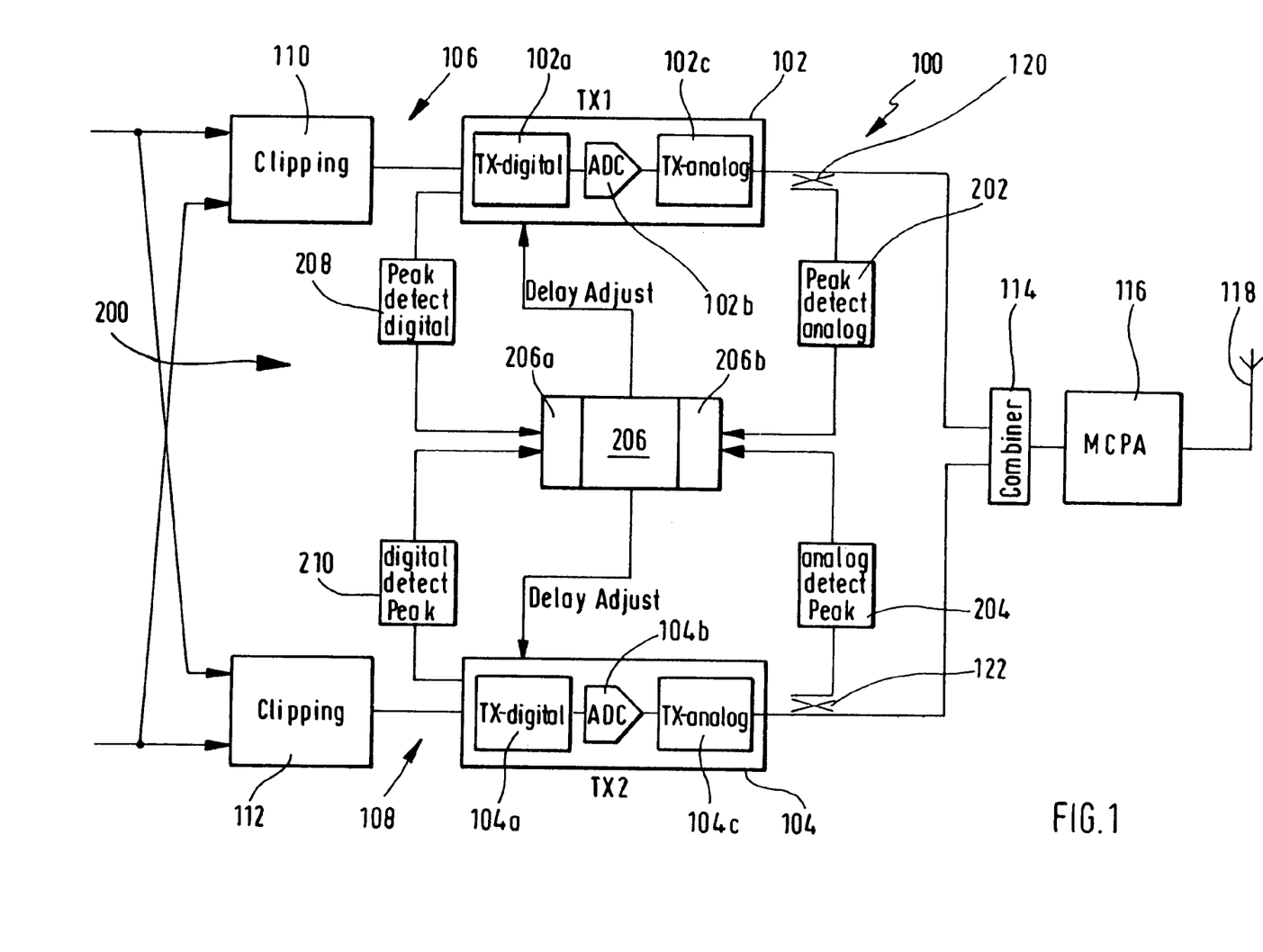
FIGS. 1 to 4 show block diagrams of a first, a second, a third, and a fourth embodiment of a device according to the invention for controlling the relative delay between analog R.F. output signals of a plurality of digital radio transmitters in a digital radio transmitter system.

In FIG. 1, schematic diagrams of a digital radio transmitter system 100 and of a device 200 for controlling a relative delay between analog R.F. output signals of two digital radio transmitters 102, 104 are illustrated. The digital radio transmitter system 100 is part of a W-CDMA base transceiver station of a cellular communication system.

The digital radio transmitter system 100 of FIG. 1 is operated in a 2-carrier mode. A first carrier is transmitted on a first radio transmitter branch 106 and a second carrier is transmitted on a second radio transmitter branch 108 of the radio transmitter system 100. Each radio transmitter branch 106, 108 comprises a clipping unit 110, 112 as well as one radio transmitter 102, 104. A first carrier transmitted on the first radio transmitter path 106 is inputted in the form of a digital baseband IQ-signal into the first clipping unit 110 and a second carrier transmitted on the second radio transmitter path 106 is inputted in the form of a digital baseband IQ-signal into the second clipping unit 112. Concurrently, information relating to the second carrier is inputted into the first clipping unit 110 and information relating to the first carrier is inputted into the second clipping unit 112. In the clipping units 110, 112 the digital signals are clipped using information of all carriers.

After clipping the first carrier and the second carrier, the clipped first carrier is inputted as a digital input signal into the first radio transmitter 102 and the clipped second carrier is inputted as a second input signal into the second radio transmitter 104. The radio transmitters 102, 104 then perform digital sampling in digital radio transmitter parts 102a, 104a, digital-analog conversion by digital-analog converters 102b, 104b, modulation and up-conversion of the received input signals in order to generate an analog R.F. output signal. The analog R.F. output signal of the first radio transmitter 102 and the analog R.F. output signal of the second radio transmitter 104 are combined by a combining unit 114, amplified by a multi-carrier power amplifier (MCPA) 116 and emitted from a single system antenna 118.

Both the first radio transmitter 102 and the second radio transmitter 104 exhibit a specific absolute delay. Due to the delay tolerances of the analog parts 102c, 104c of the radio transmitters 102, 104, the absolute delays of the two radio transmitters 102, 104 will generally not be identical. Consequently, synchronism between a digital signal travelling on the first radio transmitter branch 106 and a digital signal travelling on the second radio transmitter branch 108 will generally be lost after the behind radio transmitters 102, 104, i.e., in the analog domain. Thus, a relative delay between the output signal of the first radio transmitter 102 and the output signal of the second radio transmitter 104 will arise here. This relative delay, however, may destroy the clipping effect and thus compromise the transmission quality of the digital radio transmitter system 100.

In order to ensure a high transmission quality, the digital radio transmitter system 100 of FIG. 1 comprises a device 200 for controlling the relative delay between the analog R.F. output signals of the two digital radio transmitters 102, 104. The device 200 comprises a detector system with two analog detector units 202, 204 for detecting the analog output signals of the radio transmitters 102, 104, a processing unit 206 for determining the relative delay between the detected output signals, and an adjusting system (FIGS. 6 and 7) arranged within the digital parts 102a, 104a of the radio transmitter 102, 104. The device 200 further comprises two digital detector units 208, 210 for detecting digital input signals of the transmitter units 102, 104.

The device 200 has two interfaces 206a, 206b for receiving delay information. The first interface 206a is arranged between the digital detector units 208, 210 and the processing unit 206. The first interface 206a receives delay information in the form of detector signals from the digital detector units 208, 210 and transfers these detector signals to the processing unit 206. The second interface 206b is arranged between the two analog detector units 202, 204 and the processing 206. The second interface 206b receives delay information in the form of detector signals from the analog detector units 202, 204 and transfers these detector signals to the processing unit 206.

Next, control of the relative delay between the analog output signals of the radio transmitters 102, 104 by means of the control device 200 is described.

In a first step, the absolute delay between input of a digital signal into each radio transmitter and output of a corresponding output signal is determined for each of the two radio transmitters 102, 104. In a second step, the relative delay between the output signals of the two radio transmitters 102, 104 are calculated based on the determined absolute delays. Finally, in a third step, the absolute delay of one or both of the radio transmitters 102, 104 is adjusted such that the relative delay between the output signals is minimized.

The absolute delay for the radio transmitters 102, 104 is determined as follows. Each wideband CDMA signal transmitted on radio transmitter branches 106, 108 is a statistical signal with characteristic peaks. Such a characteristic peak first appears in the digital domain of the signal and after the radio transmitter's absolute delay in the analog domain at the radio transmitter output. Thus, the time interval between appearance of the characteristic peak in the digital domain and appearance of the same characteristic peak in the analog domain of the same radio transmitter branch reflects the radio transmitter's absolute delay.

In the following, the determination of the absolute delay in the first radio transmitter branch 106 is exemplarily illustrated. The digital detector unit 208 is configured as a peak detector and detects a characteristic signal peak of the digital baseband IQ-signal in the digital domain, e.g. in the digital part 102a of the radio transmitter 102. The detection is performed after the clipping unit 110 because the clipping unit changes the peak amplitude.

The detection can generally take place anywhere after the clipping unit 110 and before the analog digital converter 102b of the radio transmitter 102. However, in case of a CDMA system it is advantageous to perform the detection of the digital input signal after the digital input signal has passed a root raised cosine filter in the digital part 102a of the radio transmitter 102 because the root raised cosine filter may cause itself small delays depending on the amplitude of its input signal. While this amplitude dependence is no problem if identical input signals are inputted into root raised filters of different radio transmitter branches (e.g. in radio transmitter diversity systems), in the case of different input signals the delay control becomes more exact if the detection is performed after the root raised cosine filter.

After the digital detector unit 208 has detected a characteristic peak, the digital detector unit outputs a corresponding detector signal via the first interface 206a to the processing unit 206. This detector signal from the digital detector unit 208 is used as a start signal for starting an internal timer within the processing unit 206.

After a time interval corresponding to the radio transmitter's 102 absolute delay, the characteristic signal peak used for starting the processing unit's 206 internal timer will appear in the analog domain between the output of the radio transmitter 102 and the input of the combining unit 114. The characteristic peak in the analog domain is detected by the analog detector unit 202 which is also configured as a peak detector. The first radio transmitter branch 106 communicates with the analog detector unit 202 by means of a coupler 120. The coupler 120 is arranged somewhere between the output of the radio transmitter 102 and the input of the combining unit 114. A similar coupler 122 is arranged between the output of the other radio transmitter 104 and the input of the combining unit 114.

When the analog detector unit 202 detects the characteristic peak, a corresponding detector signal is inputted via the second interface 206b into the processing unit 206. This detector signal from the analog detector unit 202 is used as a stop signal to stop the internal timer of the processing unit 206. The time interval measured by the internal timer can thus be interpreted as the absolute delay of the radio transmitter 102. In the same manner as described above with respect to the first radio transmitter branch 106, the processing unit 206 also determines the absolute delay of the radio transmitter 104 arranged in the second radio transmitter branch 108.

Once the absolute delay of each of the two radio transmitters 102, 104 has been measured, the processing unit 206 compares the measured absolute delays. The relative delay of the output signals of the radio transmitters 102, 104 can be interpreted as the time difference between the absolute delays of the radio transmitters 102, 104.

If the absolute delays of the radio transmitters 102, 104 are identical, no further steps have to be taken since the relative delay equals zero. On the other hand, if the absolute the delays of the radio transmitters 102, 104 are not identical, the processing unit 206 determines the time difference between the absolute delays of the radio transmitters 102, 104. The processing unit 106 further determines which of the radio transmitters 102, 104 exhibits the shorter absolute delay. Based on this information, the processing unit 206 controls the adjusting system of the radio transmitter which exhibits the shorter absolute delay such that the duration of the shorter absolute delay is increased by a time interval corresponding to the determined relative delay. In other words, the shorter absolute delay is increased such that it equals the longer absolute delay. Thus, the relative delay between the analog output signals of the digital radio transmitters 102, 104 is minimized.

Figure 2:
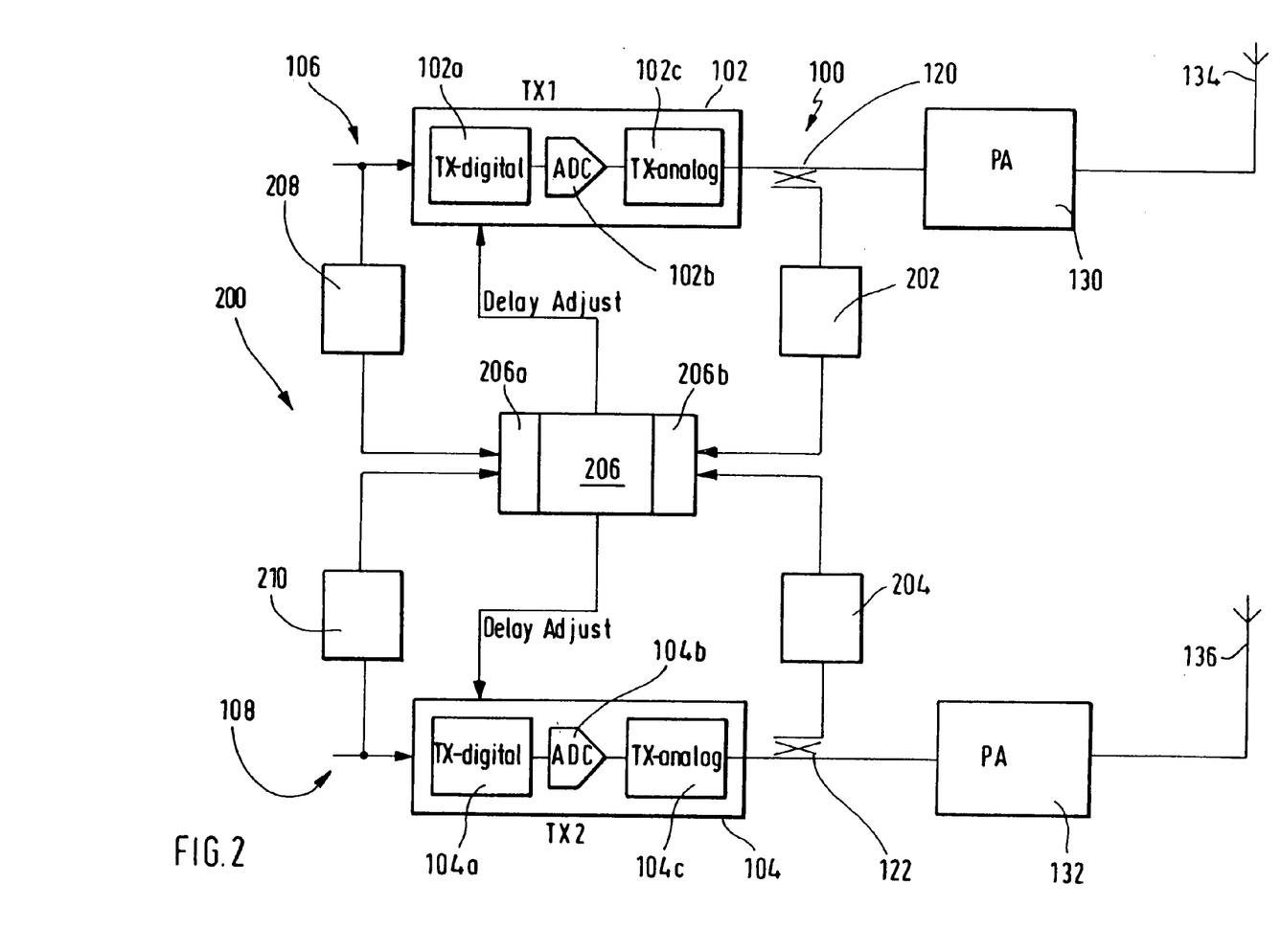

In FIG. 2, a schematic diagram of a second embodiment of a device 200 for controlling the relative delay between analog R.F. output signals of two digital radio transmitters 102, 104 in a digital radio transmitter system 100 is depicted. Whereas the digital radio transmitter system of FIG. 1 is operated in a multi-carrier mode, the digital radio transmitter system 100 depicted in FIG. 2 is operated in a radio transmitter diversity mode based on a single carrier.

Again, the digital radio transmitter system 100 comprises two radio transmitter branches 106, 108 and one radio transmitter 102, 104 per radio transmitter branch 106, 108. However, the output signals of the radio transmitters 102, 104 are not combined, but fed into to separate power amplifiers 130, 132 and emitted from separate antennas 134, 136. Consequently, each radio transmitter branch 106, 108 comprises an individual power amplifier 130, 132 and an individual antenna 134, 136.

It was pointed out above that a relative delay between the output signals of two digital radio transmitters 102, 104 operated in a radio transmitter diversity mode can result in self interference of the emitted output signals. In case of e.g. CDMA systems this is usually the case when the relative delay between the emitted output signals is greater than some fraction of the CDMA chip period. Consequently, during the radio transmitter diversity operation the relative delay between the output signals have to be controlled in order to guarantee a high transmission quality.

Again, the relative delay in the digital radio transmitter system 100 operated in a radio transmitter diversity mode is controlled by a control device 200 as discussed in context with the first embodiment. However, the digital input signal is detected by the digital detector unit 208, 210 at the input port of the radio transmitters 102, 104, i.e., prior to root raised cosine filtering.

The analog detector units 202, 204 and the digital detector units 208, 210 depicted in FIGS. 1 and 2 need not necessarily be configured as peak detectors. The detector units 202, 204, 208, 210 can also be configured to detect a pre-defined signal component or symbol sequence. Detecting symbol sequences in the output signals of the radio transmitters 102, 104 makes it necessary to perform down-conversion, sampling, analog-digital conversion, demodulation and digital filtering in the analog detector units 202, 204 or in the processing unit 206 in order to obtain the symbol sequences comprised within the output signals.

Figure 3:
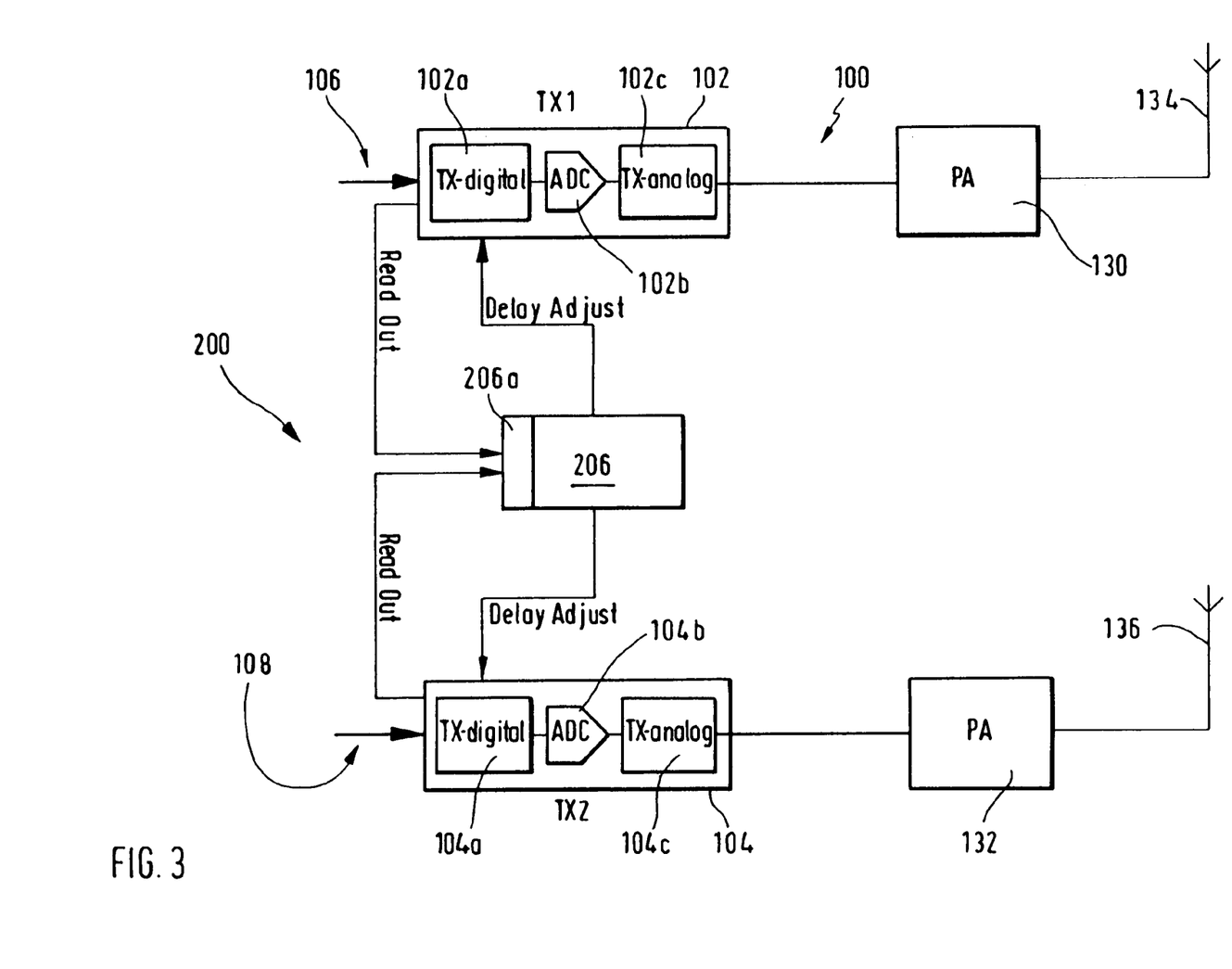

In FIG. 3, a schematic diagram of a third embodiment of a device 200 for controlling the relative delay between analog R.F. output signals of two digital radio transmitters 102, 104 in a digital radio transmitter system 100 is depicted. Like the digital radio transmitter system of FIG. 2, the digital radio transmitter system 100 of FIG. 3 is operated in a radio transmitter diversity mode based on a single carrier.

In contrast to the control devices depicted in FIGS. 1 and 2, the control device 200 of FIG. 3 does not comprise two interfaces but only a single interface 206a. The interface 206a is arranged between an individual delay database of each of the radio transmitters 102, 104 and the processing unit 206. The interface 206a is configured to read out the delay information stored in the delay databases of the radio transmitters 102, 104 and to provide the received delay information to the processing unit 206. The delay information stored in the individual delay databases of the radio transmitters 102, 104 relates to the absolute delay of each individual radio transmitter 102, 104 as measured during production of the radio transmitter 102, 104. Based on the absolute delay of each individual radio transmitter 102, 104 received via the interface 206a, the processing unit 206 calculates the relative delay and controls the adjusting system (not depicted in FIG. 3) such that the relative delay between the analog R.F. output signals of the two radio transmitters 102, 104 is minimized.

Figure 4:
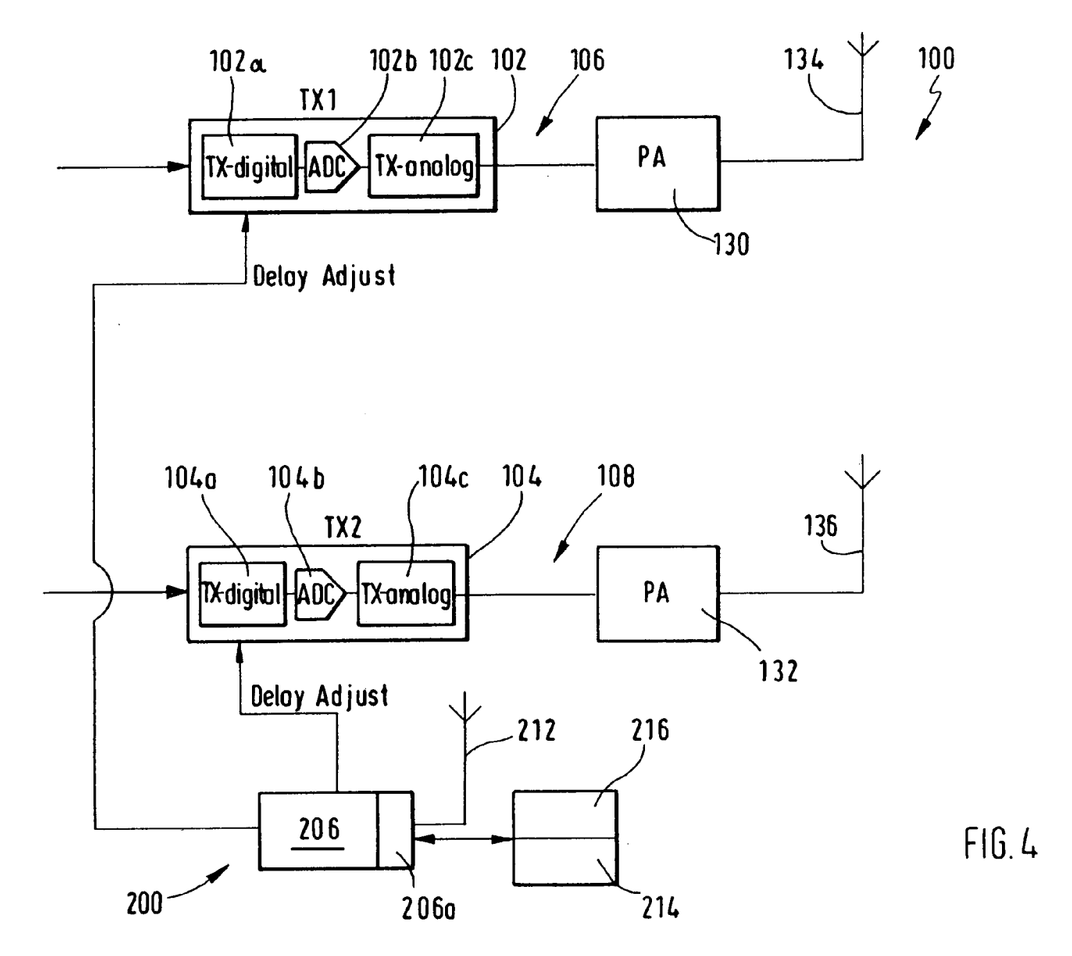

In FIG. 4, a fourth embodiment of a device 200 for controlling the relative delay between the analog R.F. output signals of two digital radio transmitters 102, 104 in a digital radio transmitter system 100 is illustrated. Similar to the digital radio transmitter systems depicted in FIGS. 2 and 3, the digital radio transmitter system 100 of FIG. 4 is operated in a radio transmitter diversity mode. The digital radio transmitter system 100 has two radio transmitter branches 106, 108. Each radio transmitter branch 106, 108 comprises an individual radio transmitter 102, 104 an individual power amplifier 130, 132 and an individual antenna 134, 136.

The device 200 for controlling the relative delay between the analog R.F. output signals of the two digital radio transmitters 106, 108 deviates from the control device 200 of the first and second embodiment in that the output signals are not detected in the signal path prior to the antennas 134, 136 but after the output signals have been emitted from an antenna system comprising the two antennas 134, 136. The detector system of the control device 200 is constituted by a small detector antenna 212 which detects the output signals of the two radio transmitters 102, 104 after they have been emitted from the antenna system of the digital radio transmitter system 100. The signals detected by the detector antenna 212 are received by the interface 206a and inputted into the processing unit 206.

Figure 5:
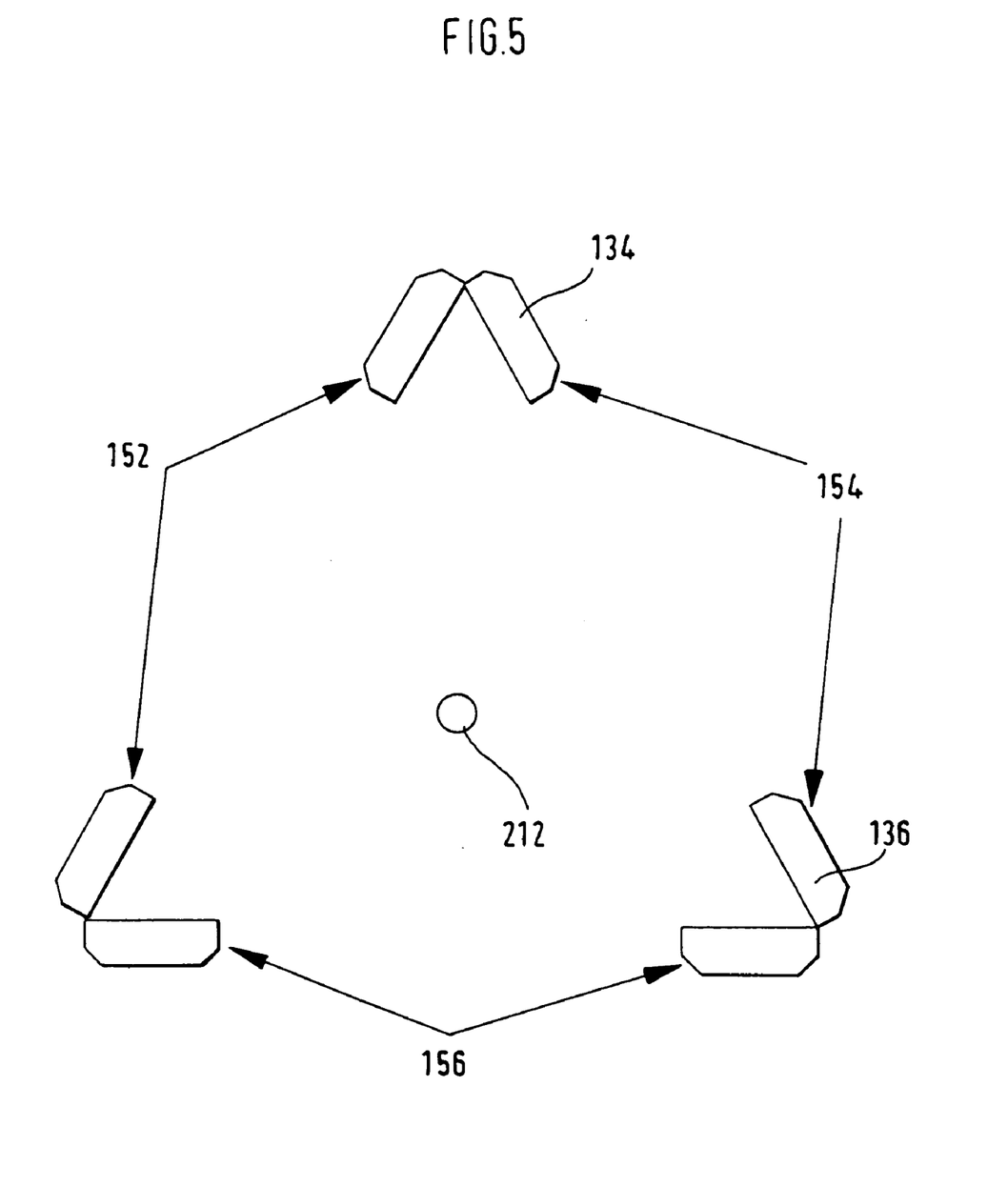
FIG. 5 shows an antenna configuration of the device depicted in FIG. 3.

The arrangement of the detector antenna 212 relative to the antenna system of the digital radio transmitter system 100 is depicted in FIG. 5. As can be seen from FIG. 5, the detector antenna 212 is arranged symmetrically with respect to the plurality of antennas of the digital radio transmitter system 100.

The antenna system of FIG. 5 comprises three antenna pairs, each antenna pair looking in the same direction and defining one of three diversity antenna sectors 152, 154, 156. For example, the two antennas 134, 136 of the radio transmitter system 100 depicted in FIG. 4 define the diversity antenna sector 154. An antenna signal of each antenna pair is emitted in a sector with an opening angle of 120°. This helps to minimize cross interference effects because a base station in a next cell that is in the shadow of the opening angle of one of the diversity antenna sectors 152, 154, 156 can use the same frequency as the corresponding diversity antenna sector 152, 154, 156.

In the antenna system depicted in FIG. 5, a delay adjustment as exemplarily depicted in FIG. 4 has to be provided for each pair of antennas. Consequently, two more arrangements similar to the arrangement of FIG. 4 can be employed to control the delay of the two additional antenna pairs, respectively, which define the diversity antenna sectors 152 and 156. Thus, three identical processing units 206 may be provided. Alternatively, these three processing units may be combined to a single processing unit for all six radio transmitters needed to operate the antenna system of FIG. 5. This would minimize hardware requirements.

Returning now to FIG. 4, it becomes clear that the processing unit 206 is not only connected to the detector antenna 212 but is via the interface 206a in communication with the main processor 214 and the system frame sync (SFS) 216 of the base transceiver station to which the digital radio transmitter system 100 belongs. The main processor 214 informs the processing unit 206 on which channels, belonging to the different branches of the sectors, a delay measurement has to be performed and how these channels are related to the SFS in formed and how these channels are related to the SFS in time. The SFS thus provides timing events.

In case of radio transmitter diversity the signals of one and the same channel have different pilot sequences on each antenna, the different pilot sequences being orthogonal to each other. The control device 200 depicted in FIG. 4 is configured to detect the mutually orthogonal pilot sequences by means of the detector antenna 212 and to determine the relative delay between the output signals of the radio transmitters 102, 104 based on the relative time differences between detecting of the pilot sequences or based on the absolute delays between the common SFS and the detected pilot sequences.

The processing unit 206 receives the channels via the detection antenna 212 and thus works e.g. like a conventional mobile telephone. The processing unit 206 performs down conversion, sampling, analog-digital conversion, demodulation and digital filtering of the received channels and delivers samples of the corresponding I and Q components with e.g. two of four times oversampling. The samples are saved in a buffer and constitute the digital representation of the received channels with a resolution of one half or one quarter of the CDMA chip time according to the oversampling rate. The time resolution of a channel measurement is determined by the time resolution of the samples.

Values between the saved samples are computed by interpolation thereby increasing the digital time resolution. In the interpolated signal the pilot sequences are identified and their absolute delay relative to the SFS of the channels and the received signal is determined. Based on the determined absolute delays the processing unit 206 calculates the mutual relative delays between the branches in each sector and controls an adjusting system in the digital part 102a, 104a of each radio transmitter 102, 104 such that the relative delays are minimized.

Other orthogonal sequences comprised within the frame structure of the signals to be transmitted can be used for determining the relative delay between the detected output signals of the radio transmitters instead of the pilot sequences. For example, in case of load sharing, the channels of different antennas have different spreading sequences which are also orthogonal to each other. Therefore, these spreading sequences can also be used for determining the relative delay between the detected output signals.

In the embodiment depicted in FIG. 4, the analog R.F. output signals are detected by means of the detection antenna 212. According to a further embodiment, the analog R.F. output signals could also be tapped off before the antennas 134, 136 by couplers not depicted in FIG. 4. In the embodiment depicted in FIG. 4 and in the embodiments of FIGS. 1 to 3 the analog R.F. output signals can be tapped off prior to or after the power amplifiers. If the output signals are tapped off between the power amplifier and an antenna, also the delay of the power amplifier may be taken into account and compensated. However, the delay variations of power amplifiers are often so minimal that tapping off the signal before the power amplifier is not critical.

When couplers are used to tap off the output signals in the embodiment depicted in FIG. 4, the output signals may be detected in the form of pilot sequences or spreading sequences. However, different symbol sequences which are comprised within the frame structure could also be detected as output signals. Moreover, instead of the provision of a separate processing unit 206 the function of the processing unit 206 could be placed within the main processor 216 of the base transceiver station.

It has been pointed out above that the adjustment system of the control devices 200 depicted in FIGS. 1 to 4 is comprised within the digital parts 102a, 104a of the radio transmitters 102, 104. In the following, the function and construction of one exemplary embodiment of an adjusting system according to the invention is illustrated in more detail. This inventive adjustment system can be used either in combination with the control devices 200 depicted in FIGS. 1 to 4 or separately, i.e. independently from these control devices 200.

Figure 6:
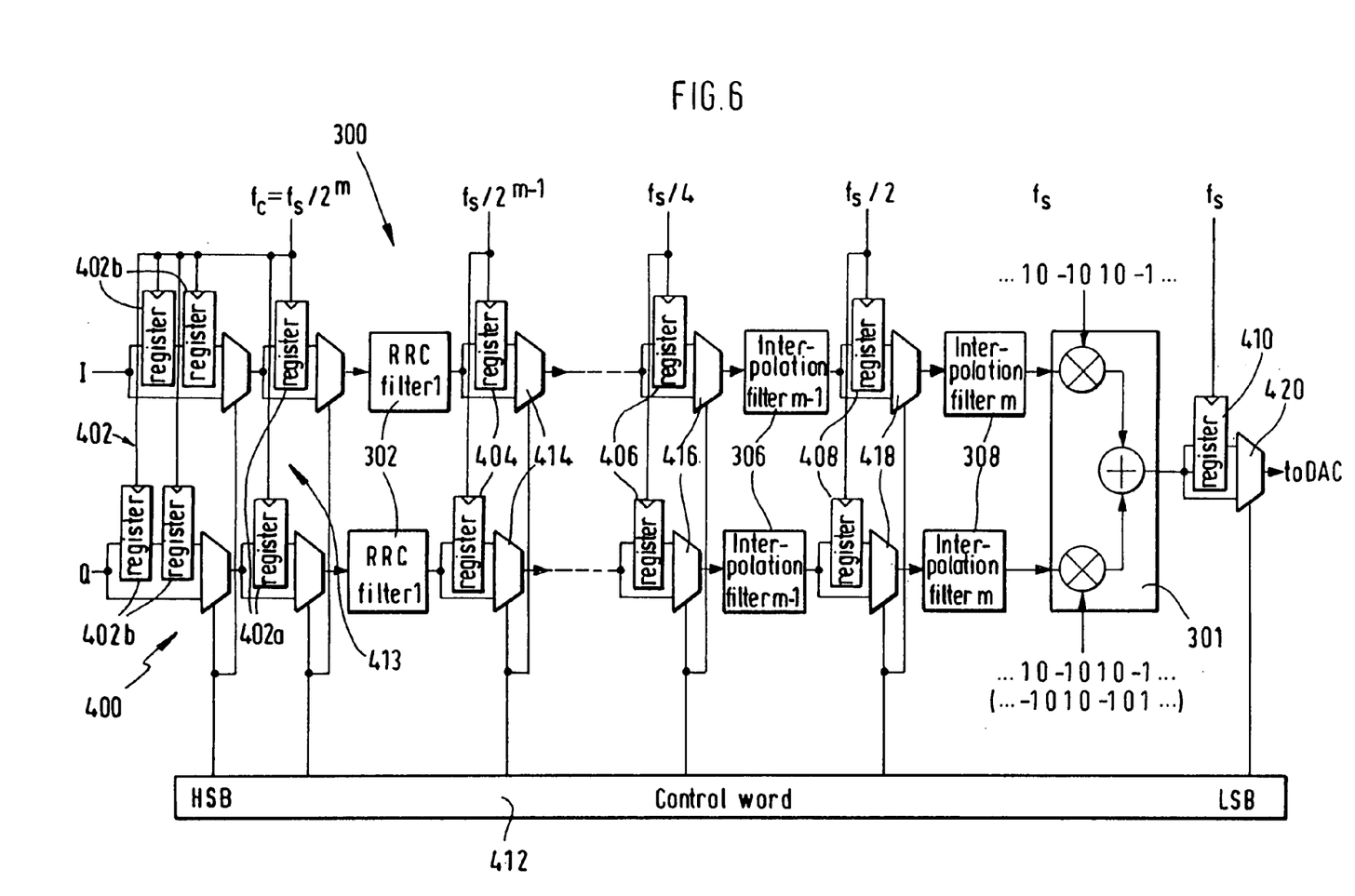
FIG. 6 shows a block diagram of the digital part of a state in the art radio transmitter.

Generally, before a digital signal is converted in a radio transmitter into an analog signal, it is processed as digital in-phase (I) and quadratur (Q) signals. In the digital part of a radio transmitter I- and Q-signals are upsampled to the specific sample rate of a subsequent digital-analog converter by a cascade of digital FIR interpolating filters. FIG. 6 shows a block diagram of the digital part of a state of the art radio transmitter with digital $f_s/4$ IQ-modulator 301 for wideband CDMA. The I- and Q-signals are delivered from a spreading and combining unit not depicted in the drawings at a CDMA chip rate $f_c$. In a root raised cosine (RRC) filter 302 the I- and Q-signal sequences are interpolated by a factor of two and root raised cosine filtered. It was pointed out in context with FIG. 1 that the digital input signal used for the determination of a radio transmitter's absolute delay is preferably detected after this RRC filter 302.

The root raised cosine filtered signals are interpolated to a sample rate $f_s$ by a chain of consecutive interpolation filters 304, 306, 308, each interpolation filter 304, 306, 308 having an interpolation factor of two. The filters 302, 304, 306, 308 constitute together an upsampling system 300, each filters 302, 304, 306, 308 defining an individual sampling stage. As can be seen from FIG. 6, the sampling frequency doubles after each sampling stage 302, 304, 306, 308. If m sampling stages 302, 304, 306, 308 are provided, the I- and Q-signal sequences entering the upsampling system 300 with the frequency of $f_c=f_s/2^m$ are interpolated to the sampling rate $f_s$.

The digital IQ-modulator 301 having a modulation frequency of $f_s/4$ combines the interpolated I- and Q-signals into a radio signal with a digital intermediate frequency of $f_s/4$. The modulated radio signal is then inputted into a digital analog converter (reference numerals 102b, 104b in FIGS. 1 to 4) which is updated at the frequency $f_s$ and which transforms the digital radio signal into the analog domain. The analog radio signal is upconverted in the analog part (reference numerals 102c, 104c in FIGS. 1 to 4) of the radio transmitter and is then amplified and transmitted from an antenna.

Figure 7:
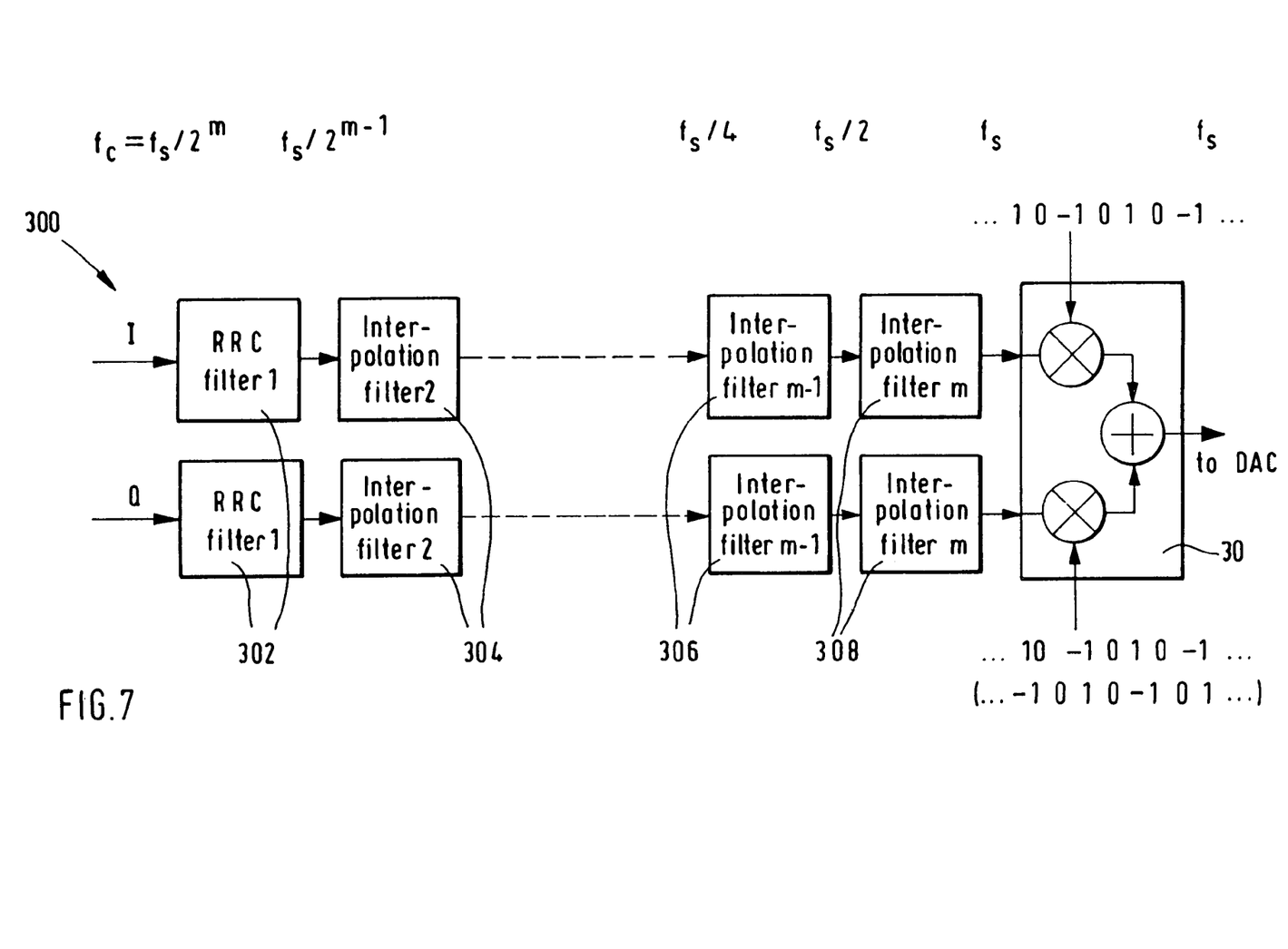
FIG. 7 shows a block diagram of an embodiment of an adjusting system for adjusting in the digital domain the absolute delay of a radio transmitter.

In FIG. 7, the digital part 102a of the radio transmitter 102 with an adjusting system 400 according to the invention is shown. The digital part 104a of the other radio transmitter 104 may comprise the same or a similar adjusting system 400. The digital part of the radio transmitter thus comprises an upsampling system with a plurality of sampling stages in the form of the filters 302, 304, 306, 308.

The adjusting system is switched in the upsampling system 300 and comprises several adjusting units 402, 404, 406, 408 which are arranged before, between and after the individual The sampling stages, i.e., the interpolation filters 302, 304, 306, 308. The adjusting units 402, 404, 406, 408, 410 are configured as delay elements in the form of shift register stages.

Each single adjusting unit 402, 404, 406, 408, 410 allows to delay the signal by one clock circle of the sample frequency of the corresponding sampling stage. Due to the cascade of sampling stages 302, 304, 306, 308 interpolating by a factor of two, the sample frequency doubles after each sampling stage 302, 304, 306, 308. This means that the delay times of the corresponding consecutive adjusting units 402, 404, 406, 408, 410 are halved from one adjusting unit to the next adjusting unit.

In FIG. 7, $z^{-k}$ denotes a delay by k times the clock cycle with the frequency $f_c=f_s/2^m$. Likewise, $z_1^{-1}$ denotes a delay by one clock cycle with frequency $2f_c=f_s/2^{m-1}$ and so on. It is clear from FIG. 7 that the lowest delay is $1/f_s$ and the highest delay is the chip period $1/f_c$ or a multiple k thereof as indicated by $z^{-k}$. For example, if the sampling rate at the digital-analog converter 102b is $f_s=65.536$ MHz and the chip rate $f_c=4.096$ Mcps, the delay can be controlled in steps of 1/16 of the chip time. Since the delay element are power of two multiples of $1/f_c$, a plurality of selectors 413, 414, 416, 418, 420 which switch in the delays can easily be controlled by the bits of a binary control word 412.

Figure 8:
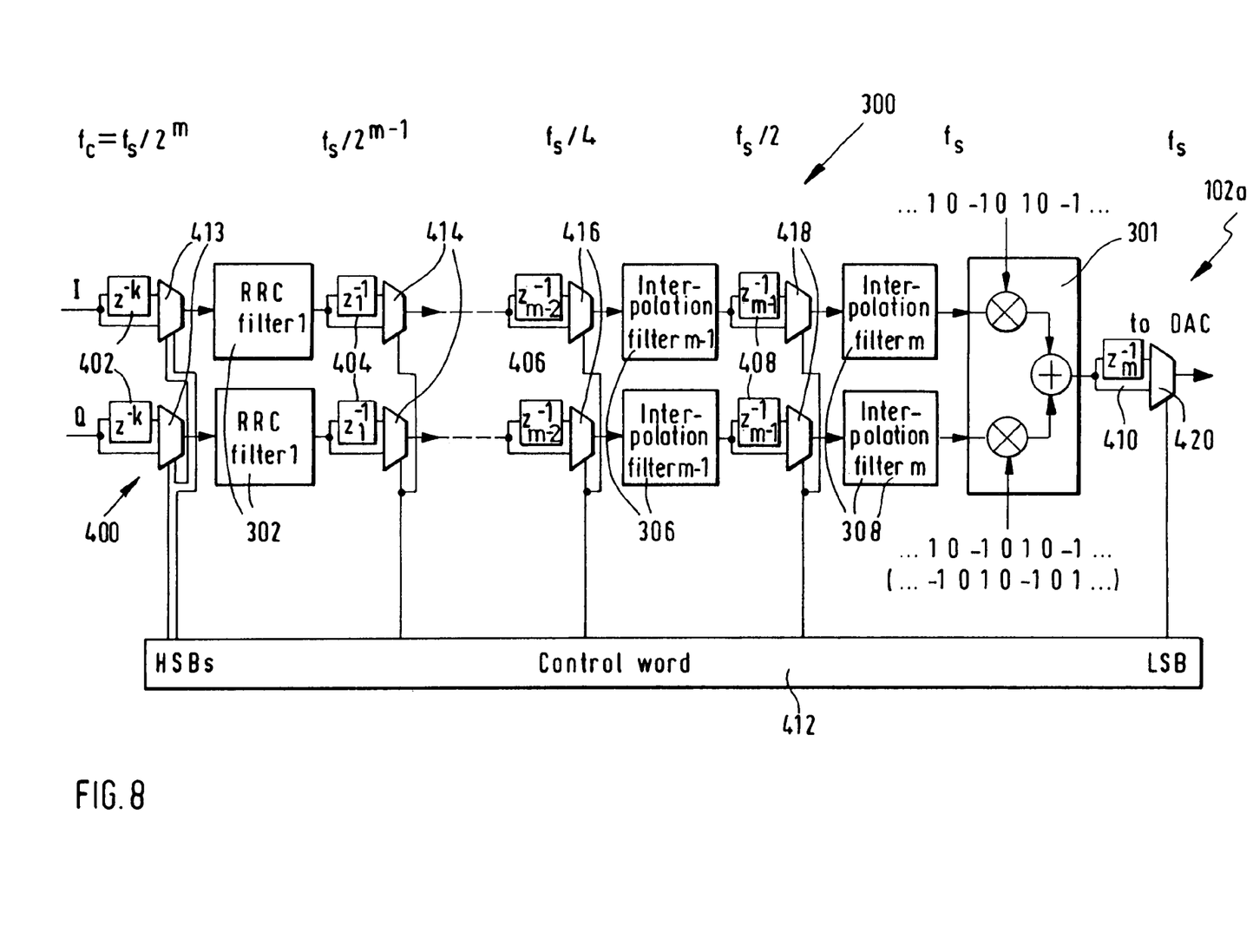
FIG. 8 shows a more detailed block diagram of the adjusting system depicted in FIG. 5.

In FIG. 8, an implementation of the adjusting system 400 of FIG. 6 is shown in more detail. Each adjusting unit 402, 404 406, 408, 410 consists of a register in the form of a number of parallel flip flops. The register width corresponds to the bit resolution of the signal samples transmitted over the I-signal path and the Q-signal path. Each adjusting unit 402, 404 406, 408, 410 is clocked by the sampling frequency of the corresponding sampling stage. Thus, the adjusting system 400 allows the adjustment of the absolute delay in the radio transmitter 102 in multiples of the sampling frequency of a specific sampling unit 302, 304, 306, 308, the sampling frequencies of the consecutive sampling units 302, 304, 306, 308 differing by a factor of two.

It has been pointed out in context with FIG. 7 that the first adjusting unit 402 delays by multiples k of the chip time. Preferably, the first adjusting unit 402 is realized as a cascade of register stages with the number of registers of a consecutive register stage being twice that of the preceeding register stage. FIG. 8 exemplarily illustrates the adjusting unit 402 which is constituted by the two register stages 402a, 402b having delays of one and two chip times, respectively. The adjusting unit 402 could be extended by register stages with 4, 8, 16 etc. registers. This allows the control of an entire chain of register stages by the bits of a binary control word.

Variations of the construction of the radio transmitter 102 may necessitate different configurations of the adjusting system 400. As an example, if the IQ-modulator 301 is realized as an analog component, the last adjusting unit 410 must be placed directly behind the last sampling stage (interpolation filter) 308 and before the analog IQ-modulator 301. Also, sampling stages having higher sampling factors than two can be employed. Different sampling factors would influence the delay times. Furthermore, as shown with respect to the first adjusting unit 402 of the adjusting unit depicted in FIG. 8, the adjusting units or the register stages comprised within an adjusting unit can be switched in series or in parallel in order to allow alternative control of the delay times. For example, adjusting units having delays differing by factors of two can be switched in series or adjusting units having delays differing by single delay times can be switched in parallel.

The invention claimed is:

1. A device for controlling a relative delay between a same analog R.F. output signal of a plurality of digital radio transmission branches in a digital radio transmitter system, each radio transmission branch including a digital part for receiving a digital input signal, a digital to analog converter for converting the digital input signal to an analog signal, and an analog part converting the analog signal to an analog RF output signal, comprising:
  at least one interface for receiving absolute delay information signals for each radio transmission branch;
  a processing unit for (1) determining an absolute delay for each radio transmission branch by determining a time difference between feeding an input signal into the radio transmission branch and providing a corresponding RF output signal from the radio transmission branch, and (2) determining the relative delay between outputting the same R.F. output signal from each radio transmission branch based on the received absolute delay information signals; and
  adjusting circuitry for adjusting in the digital part of one of the radio transmission branches the absolute delay of that one radio transmission branch in accordance with the determined relative delay.

2. The device according to claim 1, wherein the interface is configured to readout absolute delay information from each of the individual radio transmission branches.

3. The device according to claim 1, further comprising a detector system for detecting the same analog R.F. output signals of the radio transmission branches.

4. The device according to claim 3, wherein the detector system comprises, a plurality of analog detector units, each analog detector unit detecting the same analog output signal of a corresponding one of the radio transmission branches before it is emitted from an antenna system.

5. The device according to claim 1, further comprising a combining unit for combining the RF output signals of two or more of the radio transmission branches.

6. The device according to claim 3, wherein the detector system comprises a detector antenna.

7. The device according to claim 6, where plural ones of the transmission branch each has a corresponding antenna, and wherein the detector antenna is arranged symmetrically with respect to the antennas.

8. The device according to claim 1, wherein the adjusting circuitry is configured to delay one of the digital input signal in one of the receiving branches to reduce the relative delay.

9. The device according to claim 1, wherein the adjusting circuitry includes upsampling circuitry.

10. The device according to claim 9, wherein the upsampling circuitry comprises one or more sampling stages, each sampling stage operating at a specific sampling frequency, and wherein the adjusting circuitry is configured to adjust the absolute delay in accordance with the specific sampling frequencies.

11. The device according to claim 1, wherein the adjusting circuitry comprises one or more adjusting units, each adjusting unit having one or more shift registers for implementing a delay to one of the input digital signals.

12. A digital radio transmitter system comprising the device according claim 1.

13. A base transceiver station comprising the digital radio transmitter system according to claim 12.

14. A method for controlling a relative delay between a same analog R.F. output signal of a plurality of digital radio transmission branches in a digital radio transmitter system, each radio transmission branch including a digital part for receiving a digital input signal, a digital to analog converter for converting the digital input signal to an analog signal, and an analog part converting the analog signal to an analog RF output signal, comprising:
  determining absolute delay information for each radio transmission branch based on a time when the radio transmission branch outputs the same analog RF output signal;
  determining the relative delay between outputting the same RF output signal from each of the radio transmission branches based on the absolute delay information;
  adjusting in the digital part of one of the radio transmission branches the absolute delay of that one radio transmitter in accordance with the determined relative delay.

15. The method according to claim 14, wherein the same analog RF output signal in each radio transmission branch is detected during regular operation of the digital radio transmitter.

16. The method according to claim 14, wherein one of the absolute delays is adjusted to reduce the relative delay.

17. The method according to claim 14, further comprising detecting the same analog R.F. output signal of each radio transmission branch and receiving the detected output signals as absolute delay information.

18. The method according to claim 17, wherein the same analog RF output signal for each radio transmission branch is detected prior to emission from an antenna system.

19. The method according to claim 17, wherein the same analog RF output signal for each radio transmission branch is detected after emission from an antenna.

20. The method according to claim 17, wherein the relative delay is determined as the time interval between detection of the same RF output signal from different radio transmission branches or wherein the relative delay is determined as the time difference between absolute delays in different radio transmission branches.

21. The method according to claim 20, wherein each absolute delay is determined as the time interval between detection of the output signal and a common or an individual timing event.

22. The method according to claim 17, wherein the output signals are detected in the form of mutually orthogonal signal components.

23. The method according to claim 17, wherein at least one of the output signals and the input signals are detected in the form of characteristic signal peaks.

24. The method according to claim 14, wherein the absolute delay of one radio transmission branch is adjusted such that its absolute delay increases.

25. The method according to claim 14, wherein the absolute delay is adjusted during upsampling of a digital input signal of at least one of the radio transmission branches.

26. The method according to claim 25, wherein the absolute delay is adjusted based on specific sampling frequencies used during upsampling.

* * * * *